United States Patent [19]

Blersch

[11] 4,340,133
[45] Jul. 20, 1982

[54] DEVICE FOR SENSING THE ENGAGEMENT POSITION OF A CLUTCH

[75] Inventor: Arthur Blersch, Markdorf, Fed. Rep. of Germany

[73] Assignee: Zahnradfabrik Friedrichshafen AG, Fed. Rep. of Germany

[21] Appl. No.: 152,814

[22] Filed: May 23, 1980

[30] Foreign Application Priority Data

May 23, 1979 [DE] Fed. Rep. of Germany ....... 2921032

[51] Int. Cl.³ ................... F16D 27/02; F16D 27/12; F16D 43/20
[52] U.S. Cl. ............... 192/30 W; 192/56 R; 192/67 A; 192/84 R; 192/84 A; 192/84 AA; 340/686
[58] Field of Search ............... 192/30 W, 56 R, 67 A, 192/84 R, 84 A, 84 AA, 150; 340/681, 686, 687

[56] References Cited

U.S. PATENT DOCUMENTS

| | | | |
|---|---|---|---|
| 3,148,325 | 9/1964 | Burk, Jr. ................... | 340/686 |
| 3,411,076 | 11/1968 | Federici et al. ............ | 340/686 X |
| 3,419,798 | 12/1968 | Walton ...................... | 340/686 X |
| 3,473,109 | 10/1969 | Maaz et al. ................ | 340/686 X |
| 3,603,437 | 9/1971 | Spencer ..................... | 192/84 A |

FOREIGN PATENT DOCUMENTS

| | | | |
|---|---|---|---|
| 892405 | 10/1953 | Fed. Rep. of Germany .... | 192/56 R |
| 2361474 | 6/1974 | Fed. Rep. of Germany . | |
| 2456509 | 12/1976 | Fed. Rep. of Germany . | |
| 2714559 | 5/1978 | Fed. Rep. of Germany . | |
| 1177826 | 12/1958 | France ...................... | 192/84 P |
| 1337316 | 10/1963 | France . | |
| 1325886 | 7/1964 | France . | |
| 140868 | 7/1947 | Sweden ..................... | 192/84 P |

OTHER PUBLICATIONS

Siemens Katalog KB 1979.

Primary Examiner—Allan D. Herrmann
Attorney, Agent, or Firm—Lyon & Lyon

[57] ABSTRACT

A device for sensing the engagement position of a mechanical or electromagnetic clutch engaged through axial movement of a section of the clutch includes an axially movable clutch section. A magnetic circuit is activated by the movable section and a sensor mounted relative to the clutch section senses magnetic flux from the magnetic circuit, thereby indicating the engagement position. There is a relay switching system with parallel excited circuits for each of a multitude of clutches operable separately.

14 Claims, 5 Drawing Figures

DEVICE FOR SENSING THE ENGAGEMENT POSITION OF A CLUTCH

BACKGROUND

This invention relates to a device for the sensing of the operating condition of a gearshift clutch. In particular, the invention concerns the sensing of the proper engagement position for turning on a gearshift clutch, such a clutch being activated by the axial movement of one of its sections.

The monitoring of the starting position is especially important with mechanical gear clutches, as well as electromagnetic gear clutches. When such clutches are engaged, two different engagement positions have to be considered. In the first engagement position, the teeth of the gear of one clutch section face the corresponding tooth gaps of the gear of the other clutch section. In this instance, the clutch is capable of engaging completely and can now transmit the full normal moment.

In the second engagement position, the teeth of the gear of one side face the teeth of the gear on the opposing side and upon coupling, the teeth remain in the "tooth-on-tooth" position. In this situation, the clutch can only transmit a small portion of the normal moment. If accelerated slowly, the clutch can slide from the "tooth-on-tooth" position into the desired "tooth-in-tooth" position (namely, the first engagement position), and is then completely engaged. However, with fast acceleration, the time for such an engagement is too short with the result that the tip of the teeth bounce against the flanks of the opposing teeth and are repelled causing the clutch to slip. This leads to damage of the gears and is therefore undesirable. It can only be avoided if one can reliably sense the "tooth-in-tooth" and "tooth-on-tooth" positions and can tell them apart.

In the case of electromagnetically activated gear clutches, it is customary to deal with the problem of the coupling position by superimposing an alternating current over the energizing direct current. In this instance, the variable alternating current resistance at open or engaged clutch positions (and thus open and closed magnetic circuits) is converted into a corresponding signal, through suitable circuitry. For this kind of sensing, however, a complicated and laborious installation is necessary.

It is also possible to provide an inductive circuit closer for the sensing of the engagement position. This closer circuit is activated by a circular lug which is fastened to the moving section of the clutch. Such a circular lug requires additional space which is not always available. In addition, extremely precise and true adjustments are necessary and this can cause difficulties.

The invention undertakes to provide a device for the sensing of the engagement positions of a clutch, which device quickly and reliably signals the current position of the moving section of the clutch. The device can be simply obtained by using as few parts as possible, the parts requiring little space and, above all, do not need to be affixed to the moving section. Possible breakdowns may accordingly be repaired easily and quickly and no extraordinary precision would be needed for the mounting of the additional parts to be installed. In addition, the device may be installed in existing clutches, quickly and simply.

SUMMARY OF THE INVENTION

According to the invention there is provided a device for sensing the engagement position of a clutch adapted to be engaged through the axial movement of a section of the clutch. The axially moving clutch section activates a magnetic circuit. There is a sensor for sensing the magnetic flux of the magnetic circuit, thereby to provide a sensing of the engagement position of the clutch.

Accordingly, the device consists of a sensor through which the fluctuations of the magnetic flow, generated by the moving section of the clutch, can be "sensed" and evaluated. This sensor is permanently attached to the housing of the clutch and does not come into contact with the running parts.

According to a further feature of the invention, it is advantageous, in the case of electromagnetically energized clutches, to sense the electromagnetic stray field of the operating magnet, without any delay.

In connection with these kinds of clutches, the invention profitably exploits the fact that the magnetic field of an open, disengaged magnetically operated clutch is different in intensity and spatial flow from the magnetic field of an engaged clutch. Electromagnetic clutches as a rule are so constructed that when the armature of an engaged clutch is in operating position the sum total of airspace in the magnetic field is a minimum, or zero. The magnetic flux is almost completely confined to and within the limits of the clutch. However, in an open, disengaged but energized clutch, the airspaces are substantial and thus the area of the magnetic field is also substantially extended through leaks to the outside. This condition exists briefly at the time of each engagement of the clutch while the armature is not yet in operating position. It exists also when the armature, due to jamming or any other impedance, cannot get into operating position and remains, for instance, in the "tooth-on-tooth" position of the gear clutch.

According to the invention, the leakage of the magnetic field to the outside is utilized as an indicator of the axial position of the axially movable section of the clutch, such as the armature. Should the magnetic field leakage be at a minimum, this is an indication that the armature is in operating, engagement, position, while the presence of maximum leakage indicates that the armature is not yet in operating position—either in its resting position, or somewhere between the resting or open position and operation position.

For sensing the presence of the magnetic field leakage, in accordance with the invention, there are elements which react to magnetic fields, known as sensors, such as, for instance, "Hall Probes", "Field Plates" or "Reed Contacts".

If a Reed switch is used in an appropriate manner, this device immediately delivers a clear signal which without delay and without further amplification or filtering can be used to influence the control circuit of the clutch or of other aggregates.

According to the invention, the device can also be used advantageously in the sensing of mechanically operated clutches which are equipped with gearshift sleeves. Using another, further extension of the invention, a permanent magnet is used as a sensing magnet, the magnet being attached to one of the activating parts, in this case, the coupling sleeve. It is especially expedient to attach the permanent magnet to the stop collar of the sleeve or to the sleeve itself, thereby saving space.

The strength of the magnetic field which permeates the surrounding area and thereby addresses the sensor, depends on the axial position of the moving section and, further, on the engaged or disengaged condition of the coupling sleeve.

DRAWINGS

The invention is further described with reference to the accompanying drawings:

FIG. 1 is an axial view of an electromagnetically activated gearshirt clutch, with the clutch engaged and arranged according to the invention.

FIG. 2 is the same view of the clutch as in FIG. 1, but with the clutch disengaged.

FIG. 3 is an axial sectional view of a mechanically activated gearshift clutch, in disengaged position, and arranged according to the invention.

FIG. 4 is the same view of the clutch as in FIG. 3, but with clutch engaged.

FIG. 5 is a relay schematic of a relay system for the automatic connecting and disconnecting of one or more gear clutches in response to one or more sensors.

DESCRIPTION OF THE DRAWINGS

The clutch shown in FIGS. 1 and 2 is a gear clutch 1 whose magnet 2 houses a coil 3 and to whose outside a tooth gear 4 is attached. Another tooth gear 7 is attached to the outside of the axially moving armature plate 9. This gear 7 engages with gear 4 of the magnet 2. In essence, a sensor 5 is permanently installed above the gears of the clutch, close to their outside periphery, but not touching them. In the engaged position (FIG. 1) the magnetic flux of the activating magnet coil 3 flows almost exclusively through magnet body 2 and armature 9, thereby creating magnetic flux 8. In the open, non-engaged position, this magnetic flux will also have a stray flux leak 6 which will also flow through the sensor 5.

The clutch shown in FIGS. 3 and 4 is a mechanically activated clutch 21, which is shifted by gearshift sleeve 22. Its movement is limited by stop collar 24. A permanent, ring shaped magnet 23 is installed in the outer circumference of the collar where it also serves as detent for gearshift sleeve 22. Close above magnet 23, but not touching it, is located a permanent sensor 5. When the gearshift sleeve is in the stop position (clutch open, FIG. 3), a magnetic flux 25 is caused by permanent magnet 23, which flux 25 is in the shape of a closed circle also flowing through the gearshift sleeve. When the gearshift sleeve is moved to the clutch engaged portion as shown in FIG. 4, a magnetic stray flux 26 occurs which also flows through sensor 5.

Figures 1, 2:
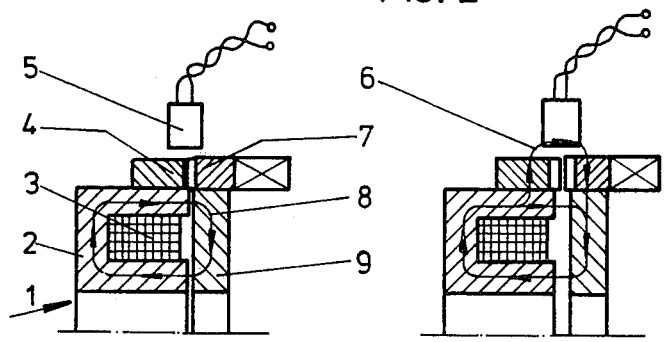
Figure 3:
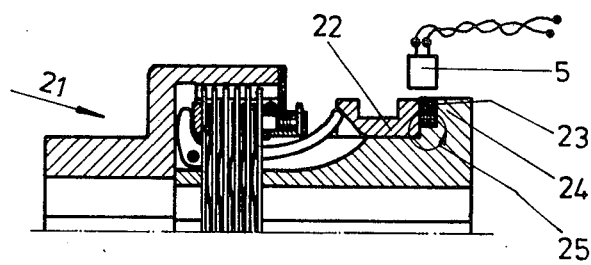
Figure 4:
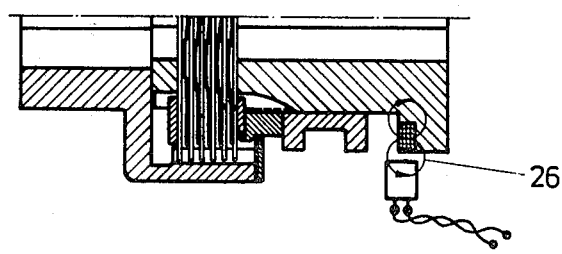
Figure 5:
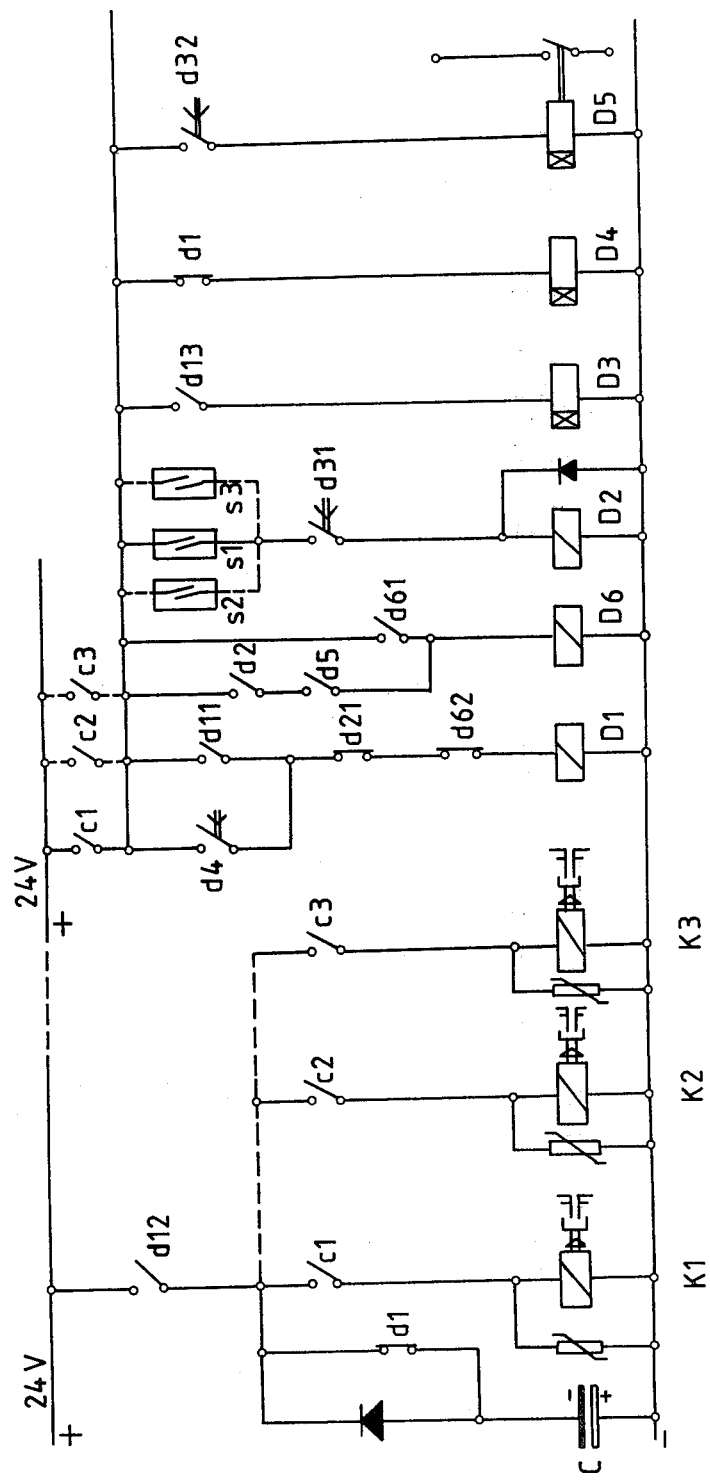
FIG. 5 shows an example of a relay-schematic which, depending on the sensor signals from one or more sensors, automatically turns off the clutch associated with its respective sensor, and, after a delay turns it on again until the proper position of the gear teeth is reached. This is when the sensor ceases to give off termination signals, namely, when the "tooth-in-tooth" engagement position is attained.

As an example, let us assume that the relays indicated by dotted lines, their switches, as well as the sensor contacts indicated by dotted lines, do not exist. These are clutch guards C2, C3, coupling switches c2 and c3, and sensors S2 and S3, described further below. Now, the automatic turning-on and off, in order to avoid the "tooth-on-tooth" position—the second engagement position—and also the turning-off, in the event of an overload, operates as follows:

For the turning-on process, and assuming that the engagement of the gear clutch K1 takes place at a slow speed, firstly the time delay relay D4 is activated through clutch guard C1, via switch c1, switch d1 being closed. The contact of relay d4 activates relay D1, after a delay of approximately two seconds, switches D21 and D62 being closed. Relay D1 is now, through the closing of switch d11, in a self-locking position. Clutch K1 is turned on by switch D12 which closes. In addition, time delay relay D3 receives voltage through switch D13 which closes. Now sensor S1 is put into the circuit of relay D2 through closing of switch d31. In addition, time limit relay D5 is turned on, after a time delay, via switch d32. The latter will finally release the unimpeded operation of the clutch unit.

If sensor S1 is open, that is not excited, then the clutch is properly engaged, relay D5 allows the unimpeded engaging, cancelling all other preventative measures, subject to the designated time delay.

If, however, the sensor is excited to generate a sensing signal, that is Reed contact s1 is activated (or Field plate or Hall generator show an appropriate test voltage), then the clutch is in "tooth-on-tooth" condition. In that event—and only that event—relay D2 pulls up and the corresponding switch d21 breaks the circuit of relay D1. Thereby, the clutch, via switch d13 and relay D3, is turned off. However, relay D4 is now activated once again, and the turning-on and turning-off repeats itself until the "tooth-in-tooth" clutch position is reached which means that the switch of sensor S1 will remain open, and no sensing signal is generated.

In the event of an overload, that is when the torque is so great that the toothed wheels may separate, the above-shown schematic works as well, and the clutch is shut off electrically. In this instance, relay D1 pulls up, since switch d5 is turned on. When addressed by sensor S1, relay D2 closes its circuit through switch d2. This relay is then kept excited by switch d61. The circuit to relay D1 is now broken by switch d 62, which prevents the automatic starting scheme from becoming operative.

Capacitor C, in the quenching circuit of the clutch—parallel to relay C1—brings about a certain quenching of remanence, and thus prevents a possible sticking in the "tooth-on-tooth" position after turning-off of the clutch. For a working example, the capacitor C will have a capacitance of more than or equal to $4,000\mu F$.

As indicated by the dotted lines, the schematic may be used at the same time for a number of gear clutches, subject however to the restriction that only one clutch at a time is engaged within such a multi-stage unit. In the above operative example, it has been assumed that a three-stage unit will be employed, wherein for each state, only one gear clutch at a time will be switched on or engaged. It is possible to augment the scheme by adding two coupling relays for the additional clutches K2 and K3. These may be engaged via coupling switches C2 and C3 while switches c2 and c3 are activated. c1, c2 and c3 constitute a paralel exciter circuit operating through a single switch d1. There is a joint power supply for each of the exciter circuits, and the relay switching system has parallel connected sensor switches, and relay switches as described above.

One of the advantages of the invention is its capability to react in the event an overload occurs in the clutch system. If a "tooth-on-tooth" situation arises in a gearshift clutch, the build-up of the magnetic stray flow addresses a sensor which, in turn, relays a signal. The further effects of this signal will cause the shut-down of the clutch and, if necessary, other parts of the machinery.

A further advantage is the immediate detection of this dangerous condition during the take-up of the clutch. This prevents the kind of abrasive slippage which tends to damage the gear clutch.

In addition, even a signalled "tooth-on-tooth" condition can cause damage of the clutch at the very start of its engagement. The invented device is capable of sensing this situation and remedying it by applying appropriate remedial measures such as, for instance, the automatic turning-on and off, of the clutch.

The present embodiments of the invention are to be considered in all respects as illustrative and not restrictive, the scope of the invention being indicated by the appended claims rather than by the foregoing description.

I clam:

1. A device for sensing the engagement position of a clutch adapted to be engaged through the axial movement of a movable section of the clutch with an engagable section of the clutch, comprising a magnetic circuit adapted to be responsive to movement of the movable clutch section relative to the engagable clutch section, sensor means mounted in a predetermined position relative to the clutch sections and adapted to respond to a leakage magnetic flux from the magnetic circuit, thereby to provide a sensing of the position of the movable clutch section and sensing of the engagement position of the clutch.

2. A device according to claim 1 wherein the sensor means for sensing of the magnetic flux of the magnetic circuit is adapted for use in gearshift clutches operable electromagnetically.

3. A device according to claim 1 wherein the axially movable section of the clutch is adapted to influence the magnetic circuit such that the magnetic circuit is either in an open position of a closed position.

4. A device according to claim 1 wherein the sensor means provides an output voltage, such voltage being adapted to activate an electrical circuit of an electromagnetic clutch whereby an exciter circuit of a non-engaged clutch is at least temporarily opened.

5. A device for sensing the engagement position of a clutch adapted to be engaged through the axial movement of a movable section of the clutch with an engagable section of the clutch, comprising a magnetic circuit adapted to be responsive to the position of the movable clutch section relative to the engagable clutch section, sensor means mounted in a predetermined position relative to and apart from the clutch sections and adapted to respond to a leakage magnetic flux from the magnetic circuit, thereby to provide a sensing of the position of the movable clutch section and sensing of the engagement position of the clutch.

6. A device according to claim 5 wherein the sensor means for sensing of the magnetic flux of the magnetic circuit is adapted for use in gearshift clutches operable electromagnetically.

7. A device according to claim 5 wherein the axially movable section of the clutch is adapted to influence the magnetic circuit such that the magnetic circuit is either in an open position or a closed position.

8. A device according to claim 5 wherein the sensor means provides an output voltage, such voltage being adapted to activate an electrical circuit of an electromagnetic clutch whereby an exciter circuit of a non-engaged clutch is at least temporarily opened.

9. A device for sensing the engagement position of a clutch adapted to be engaged through the axial movement of a section of the clutch, comprising a magnetic circuit adapted to be responsive to movement of the movable clutch section, sensor means mounted in a predetermined position relative to the clutch section and adapted to respond to a magnetic flux from the magnetic circuit, thereby to provide a sensing of the position of the movable clutch section and sensing of the engagement position of the clutch, wherein the axially movable section of the clutch is adapted to influence the magnetic circuit such that the magnetic circuit is either in an open position or a closed position, and the magnetic circuit includes at least one permanent magnet, the magnet being positioned at a stop collar of a gearshift sleeve in a mechanically operated clutch.

10. A device according to either of claims 1 or 9 wherein the sensor means is a "Reed Switch".

11. A device according to either of clams 1 or 9 wherein the sensor means is either a "Field Plate" or a "Hall Generator".

12. A device for sensing the engagement position of a clutch adapted to be engaged through the axial movement of a section of the clutch, comprising a magnetic circuit adapted to be responsive to movement of the movable clutch section, sensor means mounted in a predetermined position relative to the clutch sections and adapted to respond to a magnetic flux from the magnetic circuit, thereby to provide a sensing of the position of the movable clutch section and sensing of the engagement position of the clutch, wherein the sensor means provides an output voltage, such voltage being adapted to activate an electrical circuit of an electromagnetic clutch whereby an exciter circuit of a non-engaged clutch is at least temporarily opened, and including several electromagnetically operated gearshift clutches each having an exciter circuit, the exciter circuits being parallel and each exciter circuit being energized when the other exciter circuits are de-energized, the electrical circuit including a relay switching system, the relay switching system providing a joint current supply circuit for the parallel exciter circuits and the exciter circuits functioning through a single switch, relay switches in the relay switching system, such switches being parallel connected, and sensor switches for the sensor means of each clutch, the sensor switches being connected in parallel, whereby the sensing switch reacts when one of the sensor means emits a sensing signal.

13. A device for sensing the engagement position of a clutch adapted to be engaged through the movement of one section of the clutch, the clutch having at least two relatively movable sections, the device comprising a magnet located on one of the clutch sections and a magnetic circuit including both sections and adapted to be responsive to the relative movement of the clutch sections, sensor means mounted in predetermined position relative to and apart from the clutch sections and adapted to respond to a magnetic flux from the magnetic circuit, there being a difference in the leakage magnetic flux dependent on the positions of the two clutch sections relative to each other, an electric circuit adapted for connection with the sensor means and responsive to the sensor means whereby the engagement position of the clutch sections is sensed, the circuit being adapted to cooperate with the relatively movable clutch sections such that in response to the sensor means engagement of the clutch sections is facilitated.

14. A device as claimed in claim 13 wherein the sensor means and electric circuit is responsive to overload conditions in the clutch, thereby to effect disengagement of the clutch sections during overload.

* * * * *